(12) United States Patent  (10) Patent No.: US 8,575,262 B2
Bohling et al.  (45) Date of Patent: Nov. 5, 2013

(54) AQUEOUS POLYMERIC DISPERSION AND METHOD FOR PROVIDING IMPROVED ADHESION

(75) Inventors: James C. Bohling, Lansdale, PA (US); Andrew Hejl, Lansdale, PA (US); Alvin M. Maurice, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 913 days.

(21) Appl. No.: 12/460,072

(22) Filed: Jul. 13, 2009

(65) Prior Publication Data

US 2010/0034975 A1 Feb. 11, 2010

Related U.S. Application Data

(60) Provisional application No. 61/137,936, filed on Aug. 5, 2008.

(51) Int. Cl.
*C08F 220/04* (2006.01)
*C08F 230/02* (2006.01)
*C08K 5/3437* (2006.01)

(52) U.S. Cl.
USPC ........... 524/556; 524/87; 524/485; 427/385.5

(58) Field of Classification Search
USPC .......................... 427/385.5; 524/87, 485, 556
See application file for complete search history.

(56) References Cited

U.S. PATENT DOCUMENTS

| | | | | |
|---|---|---|---|---|
| 5,215,679 | A | * | 6/1993 | Cramm et al. ............ 252/301.35 |
| 5,897,811 | A | * | 4/1999 | Lesko ...................... 252/301.35 |
| 6,492,451 | B1 | | 12/2002 | Dersch et al. |
| 6,534,598 | B2 | | 3/2003 | Kuo et al. |
| 2005/0222299 | A1 | | 10/2005 | Garzon et al. |
| 2008/0146724 | A1 | | 6/2008 | Bohling et al. |

FOREIGN PATENT DOCUMENTS

WO  WO 99/25780 A1  5/1999

OTHER PUBLICATIONS

Inigo Gonzalez et al; "Adhesion enhancement in Waterborne acrylic latex binders synthesized with phosphate methacrylate monomers"; Progress in Organic Coatings,61, 38-44(2008).
Hui Shirley Yang,Herve Adam, Jon Kiplinger, "Phosphate Polymerizable Adhesion Promoters", J Coatings Technology, 44-52 (Feb. 2005).

* cited by examiner

*Primary Examiner* — Satya Sastri
(74) *Attorney, Agent, or Firm* — Ronald D. Bakule; Karl E. Stauss

(57) ABSTRACT

This invention provides an aqueous polymeric dispersion, the polymer including, as polymerized units: from 0.1 to 10%, by weight based on the weight of the polymer, monomer selected from the group consisting of strong carboxylic acid monomers, sulfonic acid monomers and phosphorous-containing acid monomers, and from 0.01 to 3%, by weight based on the weight of the polymer, a moiety including the structure,

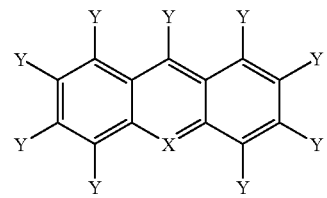

wherein X=CY, N, or P and Y, independently =H, C, N, O, Cl, Br, F, Si, S, or P. Also, a method for forming the aqueous polymeric dispersion and a method for providing a coating having improved adhesion to a substrate, particularly to a metal substrate, is provided.

9 Claims, No Drawings

AQUEOUS POLYMERIC DISPERSION AND METHOD FOR PROVIDING IMPROVED ADHESION

This application claims the benefit of priority under 35 U.S.C. §119(e) of U.S. Provisional Patent Application No. 61/137,936 filed on Aug. 5, 2008.

This invention relates to an aqueous polymeric dispersion, the polymer including, as polymerized units: from 0.1 to 10%, by weight based on the weight of the polymer, monomer selected from the group consisting of strong carboxylic acid monomers, sulfonic acid monomers and phosphorous-containing acid monomers, and from 0.01 to 3%, by weight based on the weight of the polymer, a moiety including the structure,

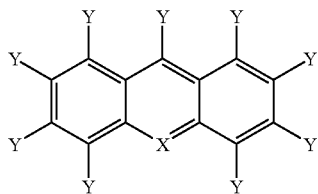

wherein X=CY, N, or P and Y, independently =H, C, N, O, Cl, Br, F, Si, S, or P. And the invention relates to a method for forming the aqueous polymer dispersion and a method for U.S. Pat. No. 5,897,811 discloses a method of preparing a fluorescent polymer whereby an ethylenically unsaturated monomer is copolymerized with a polynuclear aromatic hydrocarbon. However, aqueous polymer compositions having improved adhesion to substrates, particularly to metals such as aluminum, are still desired. When aqueous compositions such as, for example, pigmented or unpigmented coatings or paints are prepared using an emulsion polymer, as is common practice in the coating arts, adhesion to metal substrates may desirably be improved. When the select aqueous polymeric dispersions of the present invention, the polymer including, as polymerized units: from 0.1 to 10%, by weight based on the weight of the polymer, monomer selected from the group consisting of strong carboxylic acid monomers, sulfonic acid monomers and phosphorous-containing acid monomers, and from 0.01 to 3%, by weight based on the weight of the polymer, a moiety having the structure,

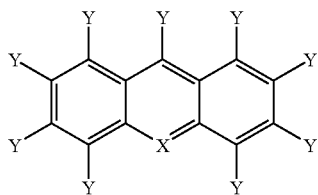

wherein X=CY, N, or P and Y, independently selected =H, C, N, O, Cl, Br, F, Si, S, or P are used, coatings can be prepared having improved adhesion to substrates, particularly to metal.

In a first aspect of the present invention, there is provided an aqueous polymeric dispersion, said polymer comprising, as polymerized units: from 0.1 to 10%, by weight based on the weight of said polymer, monomer selected from the group consisting of strong carboxylic acid monomers, sulfonic acid monomers and phosphorous-containing acid monomers, and from 0.01 to 3%, by weight based on the weight of said polymer, of a moiety comprising the structure,

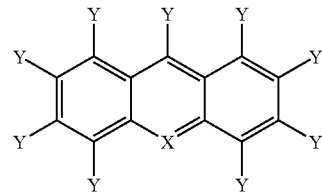

wherein X=CY, N, or P and Y, independently =H, C, N, O, Cl, Br, F, Si, S, or P.

In a second aspect of the present invention, there is provided a method for forming an aqueous polymeric dispersion comprising polymerizing from 0.1 to 10%, by weight based on the weight of said polymer, monomer selected from the group consisting of strong carboxylic acid monomers, sulfonic acid monomers and phosphorous-containing acid monomers, and from 0.01 to 3%, by weight based on the weight of said polymer, a moiety comprising the structure,

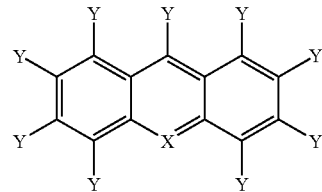

wherein X=CY, N, or P and Y, independently =H, C, N, O, Cl, Br, F, Si, S, or P.

In a third aspect of the present invention there is provided a method for providing a coating having improved adhesion to a substrate comprising
  (a) forming a composition comprising an aqueous polymeric dispersion, said polymer comprising, as polymerized units: from 0.1 to 10%, by weight based on the weight of said polymer, monomer selected from the group consisting of strong carboxylic acid monomers, sulfonic acid monomers and phosphorous-containing acid monomers, and from 0.01 to 3%, by weight based on the weight of said polymer, a moiety comprising the structure,

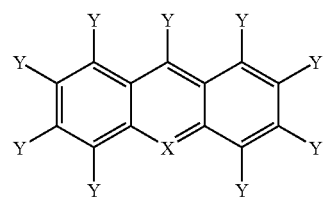

wherein X=CY, N, or P and Y, independently =H, C, N, O, Cl, Br, F, Si, S, or P.
  (b) applying said composition to a substrate; and
  (c) drying, or allowing to dry, said applied composition.

The aqueous polymeric dispersion of the present invention includes a polymer dispersed in an aqueous medium, the aqueous medium herein including water and less than 30%, by wt. based on the weight of the medium, of water-miscible compound(s). The polymer of the aqueous polymeric dispersion of the present invention includes, as polymerized units, from 0.1 to 10%, preferably from 1 to 5%, by weight based on the weight of the polymer, monomer selected from the group consisting of strong carboxylic acid monomers, sulfonic acid monomers and phosphorous-containing acid monomers. By strong carboxylic acid monomers herein is meant carboxylic acid monomers having at least one pKa<4.0 (in water at 25° C.). Preferred are phosphorous-containing acid monomers.

The acid group-containing aqueous polymeric dispersions of this invention are typically prepared by emulsion polymerization. Each typically includes, in addition to at least one of, as polymerized units, strong carboxylic acid monomer, sulfonic acid monomer, and phosphorous-containing acid monomer, at least one copolymerized ethylenically unsaturated monomer not containing the acid group such as, for example, a (meth)acrylic ester monomer including methyl (meth)acrylate, ethyl(meth)acrylate, butyl(meth)acrylate, 2-ethylhexyl(meth)acrylate, decyl(meth)acrylate, hydroxyethyl(meth)acrylate, hydroxypropyl(meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol(meth)acrylainide. The use of the term "(meth)" followed by another term such as (meth)acrylate or (meth) acrylamide, as used throughout the disclosure, refers to both acrylates or acrylamides and methacrylates and methacrylamides, respectively. In certain embodiments, the emulsion polymer includes less than 5 wt %, or in the alternative, less than 1 wt %, based on the weight of the polymer, of a copolymerized multi-ethylenically unsaturated monomer. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

In embodiments of the aqueous polymeric dispersion including a phosphorus-containing acid monomer the monomer contains at least one ethylenic unsaturation and a phosphorus acid group. The phosphorus acid monomer may be in the acid form or as a salt of the phosphorus acid groups. Examples of phosphorus acid monomers include:

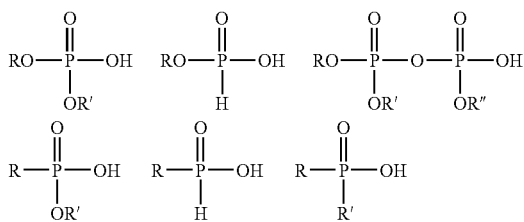

wherein R is an organic group containing an acryloxy, methacryloxy, or a vinyl group; and R' and R" are independently selected from H and a second organic group. The second organic group may be saturated or unsaturated.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl(meth)acrylate, 3-hydroxypropyl (meth)acrylates, and the like. Other suitable phosphorous acid monomers include $CH_2=C(R)-C(O)-O-(R1O)_n-P(O)(OH)_2$, where R=H or CH3 and R1=alkyl, such as the methacrylates Sipomer™ PAM-100 and Sipomer™ PAM-200 and the acrylate Sipomer™ PAM-300, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methyl-propanephosphonic acid. Further suitable phosphorus functional monomers are 1,2-ethylenically unsaturated (hydroxy) phosphinylalkyl(meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl(meth)acrylate, 3-phosphopropyl(meth)acrylate, and 3-phospho-2-hydroxypropyl (meth)acrylate. Preferred are 2-phosphoethyl(meth)acrylate, 2-phosphopropyl(meth)acrylate, 3-phosphopropyl(meth) acrylate, 3-phospho-2-hydroxypropyl(meth)acrylate, Sipomer™ PAM-100, and Sipomer™ PAM-200.

The polymer of the aqueous polymeric dispersion also includes, as polymerized units, from 0.01 to 3%, preferably from 0.1 to 2%, and more preferably from 0.2 to 1%, by weight based on the weight of the polymer, a moiety including the structure,

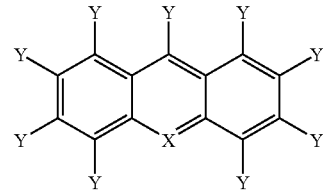

wherein X=CY, N, or P and Y, independently =H, C, N, O, Cl, Br, F, Si, S, or P. Groups including the stated Y element and bonded through it are also contemplated included herein such as for example Y=C includes the CO2H group. Preferred are X=CH or N and Y=H or C. By a "moiety" herein is meant a compound, ethylenically unsaturated monomer, or an oligomer; the moiety is capable of being covalently incorporated into the polymer of the aqueous polymeric dispersion to at least some extent, preferably to an extent of greater than 30%. Incorporation may be assayed according to the methods disclosed in U.S. Pat. No. 5,897,811. Preferred moieties incorporated in the polymer are those resulting from the formation of the aqueous polymeric dispersion in the presence of anthracene, anthracene acid, acridene, or mixtures thereof. "Anthracene acid" herein refers to an anthracene derivative including a carboxylic acid group.

The emulsion polymerization techniques typically used in the method for forming the aqueous polymeric dispersion of the present invention are well known in the art such as, for example, as disclosed in U.S. Pat. Nos. 4,325,856; 4,654,397; and 4,814,373. Conventional surfactants may be used such as, for example, anionic and/or nonionic emulsifiers such as, for example, alkali metal or ammonium alkyl sulfates, alkyl sulfonic acids, fatty acids, phosphate surfactants such as, for example, Rhodfac™ RS-610 and Rhodfac™ RS-960 and oxyethylated alkyl phenols. The amount of surfactant used is usually 0.1% to 6% by weight, based on the weight of total monomer. Either thermal or redox initiation processes may be used. Conventional free radical initiators, also referred to as catalysts, may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant, also referred to as an activator, such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. The monomer mixture may be added neat or as an emulsion in water. The monomer mixture may be added in a single addition or in multiple additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions such as those disclosed in U.S. Pat. Nos. 4,384,056 and 4,539,361, for example, may be employed.

In an embodiment of the present invention, the aqueous polymeric dispersion may be formed by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases, the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. For a multi-staged emulsion polymer, the composition shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373.

The calculated glass transition temperature ("Tg") of the polymer included in the aqueous polymeric dispersion is typically from −65° C. to 105° C., or in the alternative, from −25° C. to 35° C. Tgs of the polymers are calculated herein by using the Fox equation (T. G. Fox, Bull. Am. Physics Soc., Volume 1, Issue No. 3, page 123(1956)), that is, for calculating the Tg of a copolymer of monomers M1 and M2, $$1/Tg(calc.)=w(M1)/Tg(M1)+w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers.

The average particle diameter of the aqueous polymeric dispersion particles is typically from 30 nanometers to 500 nanometers, as measured by a Brookhaven Model BI-90 Particle Sizer supplied by Brookhaven Instrument Corp., Holtsville, N.Y.

In one embodiment of the present invention, there are provided certain aqueous compositions including the aqueous polymeric dispersion and, optionally, an inorganic particle, which compositions may find utility as aqueous coating compositions. The amount of inorganic particles included in the aqueous coating composition is from 0 to 95 volume %, based on the total dry volume of the aqueous composition and inorganic particles. Typically, the aqueous coating composition of this invention, when used to prepare dried coatings, has a solids level in the range of from 20 to 50 volume %, based on the volume of the aqueous composition. The pH of the aqueous composition is typically in the range of from 3 to 11, and preferably, in the range of from 7 to 10. A suitable viscosity range for the aqueous composition is from 50 to 130 Kreb units (KU), preferably from 70 to 120 KU, and more preferably from 90 to 110 KU.

Inorganic particles include: metal oxides such as zinc oxide, cerium oxide, tin oxide, antimony oxide, zirconium oxide, chromium oxide, iron oxide, lead oxide, aluminum oxide, silicon oxide, titanium dioxide; zinc sulfide, lithopone, calcium carbonate, calcium sulfate, barium sulfate, mica, clay, calcined clay, feldspar, nepheline syenite, wollastonite, diatomaceous earth, alumina silicates, and talc. In one embodiment, the inorganic particles may have a particle size which is from 1 to 100 nm, preferably from 1 to 50 nm. Examples of desired inorganic particles with a particle size of less than 100 nm include zinc oxide, silicon oxide, titanium dioxide, and iron oxide.

The aqueous composition may optionally contain organic pigment particles. Suitable organic pigments also include plastic pigments such as solid bead pigments and microsphere pigments containing voids or vesicles. Examples of solid bead pigments include polystyrene and polyvinyl chloride beads. Examples of microsphere pigments, which include polymer particles containing one or more voids include Ropaque™ opaque polymer and vesiculated polymer particles, as disclosed in U.S. Pat. No. 4,427,835; U.S. Pat. No. 4,920,160; U.S. Pat. No. 4,594,363; U.S. Pat. No. 4,469,825; U.S. Pat. No. 4,468,498; U.S. Pat. No. 4,880,842; U.S. Pat. No. 4,985,064; U.S. Pat. No. 5,157,084; U.S. Pat. No. 5,041,464; U.S. Pat. No. 5,036,109; U.S. Pat. No. 5,409,776; and U.S. Pat. No. 5,510,422. Other suitable pigments include, for example, Expancel™ 551 DE20 acrylonitrile/vinyl chloride expanded particles (Expancel Inc. Duluth Ga.); Sil-Cell™ 35/34 a sodium potassium aluminum silicate particles (Silbrico Corporation, Hodgkins Ill.); Dualite™ 27 polyvinylidene chloride copolymer coated with $CaCO_3$ (Pierce and Stevens Corporation, Buffalo N.Y.); Fillitte™ 150 ceramic spherical particles (Trelleborg Fillite Inc. Norcross Ga.); Microbeads™ 4A soda lime particles (Cataphote Inc.); Sphericell™ hollow glass particles (Potter Industries Inc. Valley Forge Pa.); Eccosphere™ hollow glass spheres (New Metals & Chemicals Ltd.; Essex England); Z-light™ Sphere W-1200 ceramic hollow spheres (3M St. Paul Minn.); Scotchlite™ K46 glass bubbles (3M St. Paul Minn.); Vistamer™ UH 1500 polyethylene particles; and Vistamer™ HD 1800 polyethylene particles (Fluoro-Seal Inc., Houston Tex.).

The aqueous compositions including inorganic particles are prepared by techniques which are well known in the coatings art. First, the inorganic particles are typically are well dispersed in an aqueous medium under high shear such as is afforded by a COWLES (R) mixer. Then, the aqueous polymeric dispersion of the present invention is added under low shear stirring along with other coatings adjuvants as desired. The aqueous composition may contain, in addition to the aqueous polymeric dispersion and optional pigment(s), film-forming or non-film-forming solution or other emulsion polymers in an amount of 0% to 200% by weight of the aqueous polymeric dispersion of the present invention, and conventional coatings adjuvants such as, for example, emulsifiers, coalescing agents (coalescents), plasticizers, antifreezes, curing agents, buffers, neutralizers, thickeners, photosensitive moieties, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants.

The aqueous composition optionally contains a volatile organic compound ("VOC"). A VOC is defined herein as a carbon containing compound that has a boiling point below 280° C. at atmospheric pressure. Water and ammonia are excluded from VOCs. Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons.

In one embodiment, the aqueous composition contains up to 20 weight % VOC by weight based on the total weight of the aqueous coating composition; preferably the aqueous coating composition contains less than 5% VOC by weight based on the total weight of the aqueous coating composition; more preferably the aqueous coating composition contains less than 3% VOC by weight based on the total weight of the aqueous coating composition; even more preferably the aqueous coating composition contains less than 1.7% VOC by weight based on the total weight of the aqueous coating composition.

Typical methods of aqueous paint or coating preparation introduce adventitious VOCs from the preparation of the aqueous composition, biocides, defoamers, soaps, dispersants, and thickeners. These typically account for 0.2% VOC by weight based on the total weight of the aqueous coating composition. Additional methods such as steam stripping and choice of low VOC containing additives like biocides, defoamers, soaps, dispersants, and thickeners are suitable for further reducing the aqueous coating composition to less than 0.05% VOC by weight based on the total weight of the aqueous coating composition. In one embodiment, the aqueous coating composition has less than 0.1% VOC by weight based on the total weight of the aqueous coating composition.

Additionally, the low VOC aqueous coating composition optionally contains coalescing agents that are not VOCs. A coalescing agent is a compound that is added to a water-borne emulsion polymer, paint, or coating, which reduces the minimum film forming temperature (MFFT) of the emulsion polymer, paint or coating by at least 1° C. The MFFT is measured using ASTM test method D2354. A non-VOC coalescing agent is a coalescing agent which has a boiling point above 280° C. at atmospheric pressure. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Examples of non-VOC coalescing agents include esters of unsaturated fatty acids, such as mono, di-, or tri-unsaturated fatty acids. Suitable unsaturated fatty acid esters include monounsaturated fatty acid esters formed from palmitoleic acid, oleic acid, or caproleic acid; diunsaturated fatty acid esters formed from linoleic acid; triunsaturated fatty acid esters formed from linolenic acid or eleosteric acid, or mixtures thereof. Suitable esters of unsaturated fatty acids includes alkyl esters such as, such as methyl and ethyl esters; substituted alkyl esters, such as esters formed from ethylene glycol and propylene glycol; and alkyl ether esters of unsaturated fatty acids, diethylene glycol, triethylene glycol, dipropylene glycol, tripropylene glycol, and diethylene glycol monobutyl ether. In one embodiment, the above auto autooxidizable plasticizers are used in conjunction with an aqueous composition contains 0.25% to 12.5% of acetoacetoxyethyl(meth) acrylate as polymerized units. Auto oxidation can further be enhanced by the use of metal ion catalysts such as cobalt, zirconium, calcium, manganese, copper, zinc and iron. Simple salts such as halides, nitrates, and sulfates maybe used but in many cases an organic anion such as the acetate, naphthenate or acetoacetonate is used.

In one embodiment of the present invention a method for providing a coating having improved adhesion to a substrate is provided. By "improved adhesion to a substrate" herein is meant that the adhesion of a coating including the aqueous polymeric dispersion of the present invention to a substrate is superior to that of a corresponding coating, i.e., a coating including a polymer of the same composition absent the required acid monomer and moiety of the present invention. Conventional coatings application methods such as, for example, brushing, rolling, and spraying methods such as, for example, air-atomized spray, air-assisted spray, airless spray, high volume low pressure spray, and air-assisted airless spray may be used to apply the aqueous composition of this invention. Additionally, for some systems, other application techniques may be used to apply the aqueous polymer composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, composites, and cementitious substrates; preferred is a metal substrate. Drying is typically allowed to proceed under ambient conditions such as, for example, at 0° C. to 35° C. but may be accelerated with heat or low humidity.

| Abbreviations used | |
|---|---|
| Butyl acrylate | BA |
| Butyl methacrylate | BMA |
| Methyl methacrylate | MMA |
| Methacrylic acid | MAA |
| Phosphoethyl methacrylate | PEM |
| Ammonium persulfate | APS |
| Deionized water | DI water |

EXPERIMENTAL METHODS

Aqueous polymeric dispersions were prepared in a reaction flask which was a 5-liter, four-necked round bottom flask equipped with a paddle stirrer, a thermometer, nitrogen inlet, and a reflux condenser.

Example 1

Preparation of Aqueous Polymeric Dispersions

To the reaction flask was added 900 g DI water. The contents of the flask were heated to 85° C. under a nitrogen atmosphere. Next, a solution containing 2.92 g APS dissolved in 30 g DI water was added. After stirring for 1 minute, 220 g of a 33% solids content polymer preformed emulsion with a 40 nm particle size and a rinse of 50 g DI water were added. After stirring for 2 minutes, a monomer emulsion composed of 505 g DI water, 65.1 g (31% active) anionic surfactant, 39 g PEM (50% active), 977 g BA, 15.1 g (50% active) sodium hydroxide, 935 g MMA, 9.72 g of a polyaromatic moiety listed in Table 1.1 and an initiator solution containing 1.95 g APS dissolved in 120 g DI water were added separately to the flask over 100 minutes. The contents of the reaction flask were maintained at a temperature of 85° C. during the addition of the monomer emulsion. When all additions were complete the monomer emulsion container was rinsed with 80 g DI water, which was then added to the reaction flask. The reaction flask contents were maintained at 85° C. for a period of 40 minutes. The reaction flask was cooled to 65° C. and a catalyst/activator pair was added. The reaction flask was cooled to 40° C. and aqueous ammonia (28% active) was added until a pH of 8.5 was achieved. The particle size and solids are found in Table 1.1.

TABLE 1.1

Characterization of aqueous polymeric dispersions of Example 1

| Example | Polyaromatic Moiety | Average Particle Diameter (nm) | Latex Solids (%) |
|---|---|---|---|
| 1a | Anthracene | 123 | 49 |
| 1b | Acridine | 122 | 47 |
| 1c | 9-anthracene carboxylic acid | 129 | 49 |
| Comp. A | Naphthalene | 124 | 50 |
| Comp. B | Pyrene | 123 | 50 |
| Comp. C | Phenanthrene | 124 | 50 |
| Comp. D | None | 127 | 50 |

Example 2

Preparation of Aqueous Polymeric Dispersions

To the reaction flask was added 900 g DI water. The contents of the flask were heated to 85° C. under a nitrogen atmosphere. Next, a solution containing 2.92 g APS dissolved in 30 g DI water was added. After stirring for 1 minute, 220 g of a 33% solids content polymer perform emulsion with a 40 nm particle size and a rinse of 50 g DI water were added. After stirring for 2 minutes, a monomer emulsion composed of 505 g DI water, 65.1 g (31% active) anionic surfactant, 39 g Sipomer™ PAM100 (Rhodia), 977 g BA, 7.4 g (50% active) sodium hydroxide, 935 g MMA, 9.72 g of a polyaromatic moiety listed in Table 2.1 and an initiator solution containing 1.95 g APS dissolved in 120 g DI water were added separately to the flask over 100 minutes. The contents of the reaction flask were maintained at a temperature of 85° C. during the addition of the monomer emulsion. When all additions were complete the monomer emulsion container was rinsed with 80 g DI water, which was then added to the reaction flask. The reaction flask contents were maintained at 85° C. for a period of 40 minutes. The reaction flask was cooled to 65° C. and a catalyst/activator pair was added. The reaction flask was cooled to 40° C. and aqueous ammonia (28% active) was added until a pH of 8.5 was achieved. The particle size and solids are found in Table 2.1.

TABLE 2.1

Characterization of aqueous polymeric dispersions of Example 2

| Example | Polyaromatic Moiety | Average Particle Diameter (nm) | Latex Solids (%) |
|---|---|---|---|
| Comp. E | none | 127 | 50 |
| 2 | Anthracene | 125 | 50 |

Comparative Examples F-G

Preparation of Aqueous Polymeric Dispersions

To the reaction flask was added 961 g DI water. The contents of the flask were heated to 85° C. under a nitrogen atmosphere. Next, a solution containing 2.50 g APS dissolved in 20 g DI water was added. After stirring for 1 minute, 177 g of a 33% solids content polymer perform emulsion with a 40 nm particle size and a rinse of 20 g DI water were added. After stirring for 2 minutes, a monomer emulsion composed of 505 g DI water, 65.1 g (31% active) anionic surfactant, 32 g MAA, 976 g BA, 9.0 g (50% active) sodium hydroxide, 913 g MMA, 9.72 g of a polyaromatic moiety listed in Table F-G and an initiator solution containing 2.37 g APS dissolved in 120 g DI water were added separately to the flask over 100 minutes. The contents of the reaction flask were maintained at a temperature of 85° C. during the addition of the monomer emulsion. When all additions were complete the monomer emulsion container was rinsed with 80 g DI water, which was then added to the reaction flask. The reaction flask contents were maintained at 85° C. for a period of 40 minutes. The reaction flask was cooled to 65° C. and a catalyst/activator pair was added. The reaction flask was cooled to 40° C. and aqueous ammonia (28% active) was added until a pH of 8.5 was achieved. The particle size and solids are found in table F-G.

Table F-G. Characterization of aqueous polymeric dispersions of Comp. Examples F-G

| Example | Polyaromatic Moiety | Average Particle Diameter (nm) | Latex Solids (%) |
|---|---|---|---|
| Comp. F | none | 127 | 50 |
| Comp. G | Anthracene | 125 | 50 |

Example 3

Preparation of Aqueous Polymeric Dispersions

To the reaction flask was added 920 g DI water. The contents of the flask were heated to 85° C. under a nitrogen atmosphere. Next, a solution containing 2.92 g APS dissolved in 30 g DI water was added. After stirring for 1 minute, 220 g of a 33% solids content polymer perform emulsion with a 40 nm particle size and a rinse of 50 g DI water were added. After stirring for 2 minutes, a monomer emulsion composed of 505 g DI water, 65.1 g (31% active) anionic surfactant, 20 g IA, 990 g BA, 12.0 g (50% active) sodium hydroxide, 948 g MMA, 9.72 g of a polyaromatic moiety listed in Table 3.1 and an initiator solution containing 1.95 g APS dissolved in 120 g DI water were added separately to the flask over 100 minutes. The contents of the reaction flask were maintained at a temperature of 85° C. during the addition of the monomer emulsion. When all additions were complete the monomer emulsion container was rinsed with 80 g DI water, which was then added to the reaction flask. The reaction flask contents were maintained at 85° C. for a period of 40 minutes. The reaction flask was cooled to 65° C. and a catalyst/activator pair was added. The reaction flask was cooled to 40° C. and aqueous ammonia (28% active) was added until a pH of 8.5 was achieved. The particle size and solids are found in Table 3.1.

TABLE 3.1

Characterization of aqueous polymeric dispersions of Example 3

| Example | Polyaromatic Moiety | Average Particle Diameter (nm) | Latex Solids (%) |
|---|---|---|---|
| Comp. H | none | 129 | 49.8 |
| 3 | Anthracene | 126 | 49.3 |

Example 4

Preparation of Aqueous Polymeric Dispersions

To the reaction flask was added 915 g DI water. The contents of the flask were heated to 85° C. under a nitrogen atmosphere. Next, a solution containing 2.92 g APS dissolved in 30 g DI water was added. After stirring for 1 minute, 220 g of a 33% solids content polymer perform emulsion with a 40 nm particle size and a rinse of 50 g DI water were added. After stirring for 2 minutes, a monomer emulsion composed of 505 g DI water, 65.1 g (31% active) anionic surfactant, 20 g vinylphosphonic acid, 990 g BA, 14.6 g (50% active) sodium hydroxide, 948 g MMA, 9.72 g of a polyaromatic moiety listed in table 4.1 and an initiator solution containing 1.95 g APS dissolved in 120 g DI water were added separately to the flask over 100 minutes. The contents of the reaction flask were maintained at a temperature of 85° C. during the addition of the monomer emulsion. When all additions were complete the monomer emulsion container was rinsed with 80 g DI water, which was then added to the reaction flask. The reaction flask contents were maintained at 85° C. for a period of 40 minutes. The reaction flask was cooled to 65° C. and a catalyst/activator pair was added. The reaction flask was cooled to 40° C. and aqueous ammonia (28% active) was added until a pH of 8.5 was achieved. The particle size and solids are found in table 4.1.

TABLE 4.1

Characterization of aqueous polymeric dispersions of Example a

| Example | Polyaromatic Moiety | Average Particle Diameter (nm) | Latex Solids (%) |
|---|---|---|---|
| Comp. I | none | 134 | 49.4 |
| 4 | Anthracene | 137 | 48.5 |

Example 5

Evaluation of Aqueous Polymeric Dispersions

A Solvent Premix was prepared by adding the ingredients of Table 5.1 in the order listed while stirring. A separate Pigment Premix was prepared by adding the ingredients of Table 5.2 in the order listed while stirring. The Example coating was prepared by adding the ingredients of Table 5.3 in the order listed while stirring. The levels of Acrysol® SCT-275 and water shown in Table 5.3 were adjusted as necessary in each paint in order to achieve a Krebs Unit viscosity of 90 KU.

TABLE 5.1

Solvent Premix

| Solvent Premix | Grams |
|---|---|
| Water | 78.27 |
| Ethylene Glycol | 16.67 |
| Foamstar ® A-34 (Cognis Corp. - Cincinnati OH) | 1.00 |
| Texanol ™ (Eastman Chemical Company - Kingsport TN) | 11.82 |
| Acrysol ® RM-2020 (Rohm and Haas Company - Philadelphia PA) | 14.00 |

TABLE 5.2

Pigment Premix

| Pigment Premix | Grams |
|---|---|
| Kronos ® 4311 (Kronos Inc. - Houston TX | 276.55 |
| Foamstar ® A-34 (Cognis Corp. - Cincinnati OH) | 1.00 |
| Triton ™ CF-10 (Dow Chemical Company - Midland MI) | 1.00 |
| Tamol ® 165A (Rohm and Haas Company - Philadelphia PA) | 10.07 |
| AMP-95 ™ (Dow Chemical Company - Midland MI) | 0.50 |
| Water | 92.51 |
| Acrysol ® RM-2020 (Rohm and Haas Company - Philadelphia PA) | 14.00 |

TABLE 5.3

Example Coating

| Example Coating | Grams |
|---|---|
| Solvent Premix | 121.75 |
| Example aqueous polymeric dispersion | 485.23 |
| Pigment Premix | 395.64 |
| Acrysol ® SCT-275 (Rohm and Haas Company - Philadelphia PA) | 3.40 |
| Water | 12.21 |

Example 6

Evaluation of Adhesion to Metal

A film of the test coating was prepared using a 7 mil wet Bird drawdown bar. The test paint was drawn down on an aluminum or galvanized steel panel (Q-Lab Corporation) that was first prepared by cleaning with a mineral spirits wipe and allowing to dry. The prepared wet paint film was allowed to dry for seven days prior to the adhesion testing described below.

Dry Adhesion Procedure

The dry adhesion to metal test was performed using the procedure described in ASTM D 3359-02 (Standard Test Methods for Measuring Adhesion by Tape Test), Test Method B (Cross-cut Tape Test). Results were reported on a scale of 0B-5B, as defined within ASTM D 3359-02.

Wet Adhesion Procedure

The wet adhesion to metal test was performed using the procedure described in ASTM D 3359-02 (Standard Test Methods for Measuring Adhesion by Tape Test), Test Method B (Cross-cut Tape Test). Once the film was cut in the lattice pattern described in this test method, a tissue was saturated with water and applied to the paint film to cover the entire lattice pattern. After 10 minutes, the tissue was removed, and the film was allowed to rest for 10 minutes before continuing with the tape test described in ASTM D 3359-02, Test Method B. Results were reported on scale of 0B-5B, as defined within ASTM D 3359-02.

TABLE 6.1

Aluminum Adhesion Results

| Example | Polyaromatic Moiety | Acid Monomer | Wet Al Adhesion 1 day/7 day | Dry Al Adhesion 1 day/7 day |
|---|---|---|---|---|
| 1a | Anthracene | PEM | 0/0 | 1/4 |
| 1b | Acridine | | 0/0 | 2/5 |
| 1c | 9-anthracene carboxylic acid | | 5/5 | 4/5 |
| Comp. A | Naphthalene | | 0/0 | 1/0 |
| Comp. B | Pyrene | | 0/0 | 0/1 |
| Comp. C | Phenanthrene | | 0/0 | 0/1 |
| Comp. D | None | | 0/0 | 0/0 |
| Comp. E | None | PAM100 | 0/0 | 1/4 |
| 2 | Anthracene | PAM100 | 3/1 | 5/5 |
| Comp. F | None | MAA | 0/0 | 0/0 |
| Comp. G | Anthracene | MAA | 0/0 | 0/0 |
| Comp. H | None | IA | 0/2 | 0/0 |
| 4 | Anthracene | IA | 0/4 | 0/4 |
| Comp. I | None | VPA | 1/2 | 0/0 |
| 5 | Anthracene | VPA | 3/3 | 1/4 |

TABLE 6.2

Galvanized Steel Adhesion Results

| Example | Polyaromatic Moiety | Acid Monomer | Dry Galvanized Steel 7 day |
|---|---|---|---|
| 1a | Anthracene | PEM | 4 |
| Comp. B | Pyrene | PEM | 0 |
| Comp. D | None | PEM | 0 |

Coatings including the aqueous polymeric dispersions of Examples 1a-1c and 2-5 of the present invention exhibit adhesion to metals superior to that of corresponding coatings including the aqueous polymeric dispersions of Comparative Examples A-I.

What is claimed is:

1. An aqueous polymeric dispersion, said polymer comprising, as polymerized units: from 0.1 to 10%, by weight based on the weight of said polymer, monomer selected from the group consisting of strong carboxylic acid monomers and phosphorous-containing acid monomers, and from 0.01 to 3%, by weight based on the weight of said polymer, a moiety comprising the structure,

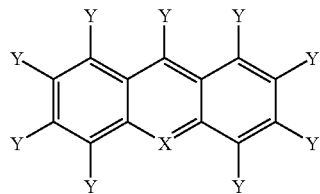

wherein X=CY or N and Y, independently =H or CO$_2$H.

2. The aqueous polymeric dispersion of claim 1 wherein said monomer is a phosphorous-containing acid monomer.

3. A method for forming an aqueous polymeric dispersion comprising polymerizing from 0.1 to 10%, by weight based on the weight of said polymer, monomer selected from the group consisting of strong carboxylic acid monomers and phosphorous-containing acid monomers, and from 0.01 to 3%, by weight based on the weight of said polymer, a moiety comprising the structure,

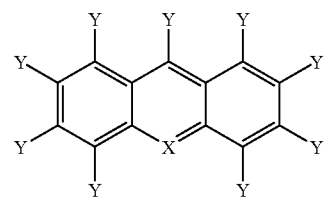

wherein X=CY or N and Y, independently =H or CO$_2$H.

4. The method of claim 3 wherein said monomer is a phosphorous-containing acid monomer.

5. An aqueous polymeric dispersion formed by the method of claim 3.

6. The aqueous polymeric dispersion of claim 5 wherein said monomer is a phosphorous-containing acid monomer.

7. The aqueous polymeric dispersion of claim 5 wherein said moiety is a material selected from the group consisting of anthracene, anthracene acid, acridine, and mixtures thereof.

8. A method for providing a coating having improved adhesion to a substrate comprising
   (a) forming a composition comprising an aqueous polymeric dispersion, said polymer comprising, as polymerized units: from 0.1 to 10%, by weight based on the weight of said polymer, monomer selected from the group consisting of strong carboxylic acid monomers and phosphorous-containing acid monomers, and from 0.01 to 3%, by weight based on the weight of said polymer, a moiety comprising the structure,

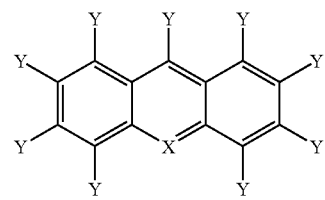

wherein X=CY or N and Y, independently =H or CO$_2$H,
   (b) applying said composition to a substrate; and
   (c) drying, or allowing to dry, said applied composition.

9. The method of claim 8 wherein said monomer is a phosphorous-containing acid monomer.

* * * * *